United States Patent [19]

Mäkelä

[11] Patent Number: 4,708,218

[45] Date of Patent: Nov. 24, 1987

[54] DRIVE BOGIE FOR A CRAWLER VEHICLE AND A CRAWLER MAT FOR USE THEREWITH

[75] Inventor: Markku Mäkelä, Tampere, Finland

[73] Assignee: Velsa Oy, Finland

[21] Appl. No.: 854,538

[22] Filed: Apr. 22, 1986

[30] Foreign Application Priority Data

Apr. 22, 1985 [FI] Finland ............................ 851590
Apr. 11, 1986 [FI] Finland ............................ 861537

[51] Int. Cl.⁴ .................................. B62D 55/08
[52] U.S. Cl. ............................ 180/9.5; 180/9.1; 180/9.62
[58] Field of Search ............. 180/9, 9.1, 9.5, 0.52, 180/0.54, 0.56, 0.62, 74; 305/20, 35 EB, 38

[56] References Cited

U.S. PATENT DOCUMENTS

| | | | |
|---|---|---|---|
| 1,705,980 | 3/1929 | Knox et al. ...................... | 180/9.62 |
| 1,975,794 | 10/1934 | Knox et al. ...................... | 180/9.1 |
| 2,998,998 | 9/1961 | Hyler et al. ...................... | 180/9.1 |
| 4,351,380 | 9/1982 | Pilliod et al. .................... | 180/9 |

Primary Examiner—John J. Love
Assistant Examiner—Donn McGiehan
Attorney, Agent, or Firm—Steinberg & Raskin

[57] ABSTRACT

A drive bogie for a crawler vehicle. The bogie comprises carrying wheels freely rotatably suspended on a solid or divided bogie beam. An endless crawler mat passes over the carrying wheels. At least one drive roll is provided, which drives the crawler mat and which is arranged to press the crawler mat against the wheels. The crawler mat is substantially resilient in every direction. The carrying wheels are suspended on the bogie beam so that the resilient crawler mat is pressed between the drive roll and carring wheels forming part of the bogie construction and situated at the sides of the drive roll.

24 Claims, 8 Drawing Figures

DRIVE BOGIE FOR A CRAWLER VEHICLE AND A CRAWLER MAT FOR USE THEREWITH

BACKGROUND OF THE INVENTION

The present invention is directed to a drive bogie for a crawler vehicle, the bogie comprising carrying wheels which are freely rotatably suspended from a solid or divided bogie beam, with an endless crawler mat passing over the carrying wheels. At least one drive roll is provided, which drives the crawler mat and which is disposed so as to press the crawler mat between the roll and the carrying wheels, e.g. from above.

The use of a crawler mat in "off-the-road" vehicles and equivalent is known in and of itself. On the one hand, attempts have been made by the use of such a crawler mat, to improve the tractive capacity of the vehicle over difficult terrain. On the other hand, attempts have been made by the use of such a crawler mat, to reduce surface pressure between the vehicle and the ground, in order to prevent the vehicle wheels from sinking too deeply into the ground. Thus, generally speaking, use of such crawler mats improves the running quality of an off-the-road vehicle over difficult terrain.

The most common arrangement in off-the-road vehicles, is an endless crawler mat being passed about the carrying wheels included in the bogie construction of the vehicle. As a rule, at least one of the carrying wheels has been arranged as a drive wheel. Another conventional drive arrangment is such that, in addition to the carrying wheels, the bogie construction is provided with a separate drive wheel which drives the crawler from inside the crawler mat. An example of such an arrangement is known, for example, from British patent No. 2,116,922.

Driving of a crawler mat from outside is also known, in and of itself, in bogie constructions. For example, in U.S Pat. No. 3,443,654, a vehicle bogie construction is disclosed in which the drive is passed by way of a cardan shaft to the bogie of a vehicle loader. A crawler mat is passed around the wheels in the bogie, with the mat being driven from outside by a drive wheel. The bogie wheels and the drive wheel are mounted on separate shafts. In this particular arrangement, the outer face of the crawler mat is provided with grasping rails, which the drive wheel can engage, thereby transmitting movement from the drive wheel to the crawler mat.

Additional bogie constructions in which the drive is explicitly arranged on the outer face of the crawler mat, are described in the prior art, for example in U.S. Pat. Nos. 3,447,620, 3,447,621; 3,533,482; 3,600,044; and 4,194,584.

Thus in prior art bogie constructions, for example in connection with forest tractors, it has been known to use two carrying wheels mounted on a bogie beam, in which at least one of the wheels is also a drive wheel. It is also known in the prior art to pass the drive to one wheel or to both wheels. The bogie is usually journalled at the middle of the wheels, at a point considerably higher than the center line between the wheels, in order to obtain adequate ground clearance, which is necessary under particular forest conditions.

The drive to the wheels may have been passed by way of a cogwheel transmission inside a box construction, from the journalling shaft of the bogie construction to the wheels. If a crawler mat passing around the wheels has been utilized, then the crawler mat has, as a rule, been driven from the inside. However, a drive from the outside has been known in the prior art, as is apparent, for example, from the above U.S. Pat. No. 3,443,654.

In connection with forest tractors, an arrangement has also been known in which the drive is provided so that a drive roll is pressed between the wheels mounted on the bogie beam, whereby the drive is transmitted from the drive roll directly to the carrying wheels, through the tires of the wheels.

However, the drive bogie arrangementsthat have been known in the prior art, have a complicated construction, and therefore the cost of manufacture is high. A further drawback of the prior art bogie constructions making use of a drive roll, is the unreliability of the drive under difficult conditions, as well as the constant loss of power and wear upon the tires, resulting from the necessary high compression force of the roll. The wear of the tires is highly extensive, especially when the drive roll is directly pressed against the tires of the carrying wheels.

The crawler mats used on the present-day bogie constructions are, almost without exception, formed to be non-extending and non-resilient in the direction of drive, i.e. in the running direction of the vehicle, because elasticity of a crawler mat is, in general, considered a drawback, especially in view of the tensioning and the guiding quality of the crawler mat. If the surface material of the crawler mat has been made of a resilient material, then the crawler mat has usually been made non-resilient by means of various draw or reinforcement layers, which have been vulcanized onto or into the surface layer. The structure of such a crawler mat principally resembles, for example, the structure of vehicle tires.

SUMMARY OF THE INVENTION

Accordingly, it is an object of the present invention to provide a new and improved drive bogie, especially for a crawler vehicle.

It is also an object of the present invention to simplify construction of a drive bogie, along with reducing cost of manufacture thereof.

It is another object of the present invention to increase reliability of operation of a drive bogie, especially under difficult conditions.

It is a further object of the present invention to conserve power consumption in the operation of a drive bogie and/or crawler vehicle.

It is still another object of the present invention to reduce wear in a drive bogie and/or carrying wheels of a crawler vehicle.

These and other objects are attained by the present invention which is directed to a drive bogie for a crawler vehicle, comprising a bogie beam, at least two carrying wheels freely rotatably suspended from the bogie beam, and an endless crawler mat passing over the wheels. The mat is constructed to be substantially resilient in every direction. Additionally, a drive roll is situated between the two carrying wheels, for pressing the crawler mat between the drive roll and the two carrying wheels which are situated at the sides of the drive roll. The drive roll may be situated to press the crawler mat from above.

By means of the present invention, considerable improvement is achieved cver the prior art bogie constructions, and over the crawler mats used on such bogie constructions. The present invention is principally characterized in that the crawler mat has a structure substantially resilient in every direction, while the carrying wheels are suspended on the bogie beam so that the resilient crawler mat is pressed between the drive roll (provided between two carrying wheels belonging to the bogie), and the carrying wheels placed at each side of the drive roll.

Several advantages are attained over prior-art constructions, in accordance with the present invention. The following benefits are among the advantages obtained in accordance with the present invention. Due to the construction and positioning of the drive roll, guiding of the crawler mat has been considerably improved. The tensioning of the crawler mat, which is an important feature of the bogie construction, and which is based upon gravity, permits the passage of stones, etc., through the construction without damaging the roll. Tensioning of the crawler mat automatically takes place, with the tensioning thereof being proportional to the load.

A better and more reliable drive has been achieved by the mutual arrangement of the drive roll, the crawler mat, and the carrying wheels, because the drive roll does not slip on the mat. The mounting of the carrying wheels on structural components of the bogie construction, permits an evasive movement of the wheels. Due to the arrangement of the bogie construction, the crawler mat can be kept clear of ice and equivalent, because the crawler mat is forced to bend in two directions.

Due to the construction of the drive roll, this drive roll can also be kept clear of ice and contamination.

A jerking property has been provided in the bogie structure due to the evasive movement of the carrying wheels that is now possible. Thus, by means of this jerking movement, the starting, for example, of the overall vehicle is improved. The resilient structure of the crawler mat provides for absorption of stones and other rubble, so that these do not hamper operation of the bogie. Furthermore, the service life of the crawler has also been extended by provision of the resilient construction of the crawler mat.

Furthermore, due to the resilient fastening of the crawler mat, these attachments remain fastened upon the resilient crawler mat much better. For example, if lateral guides were rigidly attached to the crawler mat, then the fastening might "eat" itself out of the crawler mat.

BRIEF DESCRIPTION OF THE DRAWINGS

The present invention will be described in greater detail below, with reference to the accompanying drawings, in which.

DESCRIPTION OF THE PREFERRED EMBODIMENTS

Figure 1:
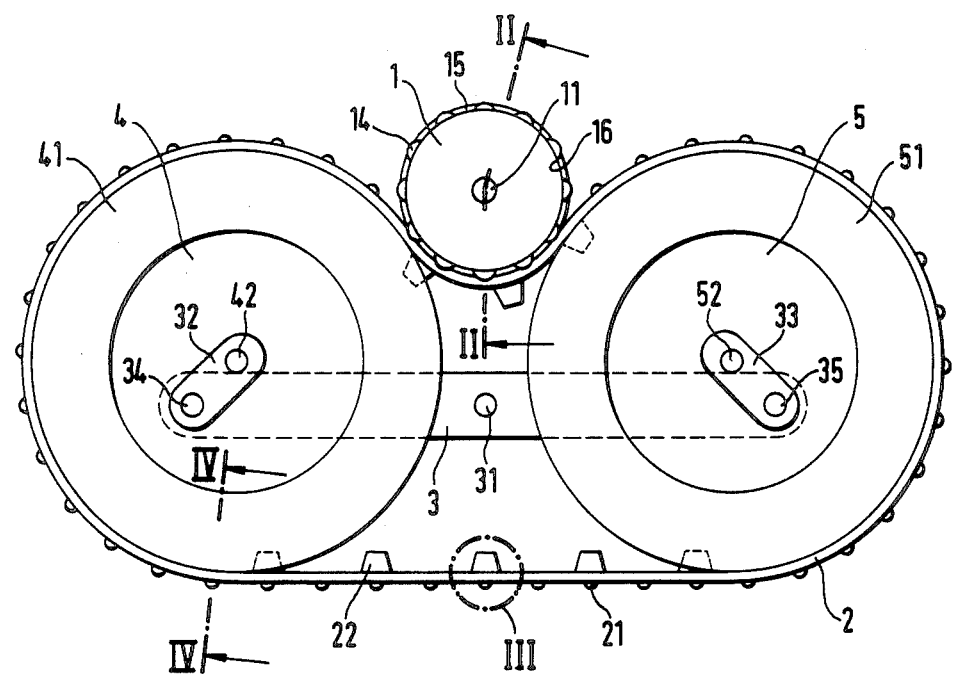
FIG. 1 is a schematic, side elevational view of a drive bogie in accordance with the present invention.

Referring to FIG. 1, which is a schematic illustration of an embodiment of a drive bogie in accordance with the present invention, the drive bogie illustrated in FIG. 1 comprises a bogie beam 3, on which carrying wheels 4 and 5 of the bogie construction are suspended to be freely rotatable. An endless crawler mat 2 passes around the carrying wheels 4 and 5, the mat 2 being driven by a drive roll 1 which presses the crawler mat 2 from above, within the region between the carrying wheels 4 and 5 as illustrated.

The bogie beam 3 is journalled upon the vehicle frame so that a pivoting center 31 of the bogie beam is situated within the area between journalling points 42 and 52 of the first carrying wheel 4 and the second carrying wheel 5 respectively. By shifting the location of the pivoting center 31 towards either of the two carrying wheels 4 or 5, the distribution of load on the bogie can be changed in any desired manner.

However, even more than by this lateral shifting of the pivoting center 31, the distribution of load in a traction situation is affected by altering the height of the pivoting center 31. The height of the pivoting center acts upon the stability of the bogie in a known manner. If desired, the pivoting center 31 may be situated so as to be located at the center of rotation of the drive roll 1, i.e. so that the pivoting center 31 coincides with the shaft 11 of the drive roll 1. With such an arrangement, tensioning of the crawler mat 2 always remains the same, irrespective of the position of the bogie. Alternatively, the pivoting center 31 of the bogie beam 3 may be situated directly underneath the shaft 11 of the drive roll 1, such as illustrated in FIG. 1.

The carrying wheels 4 and 5 are suspended on the bogie beam through a first intermediate member 32 and a second intermediate member 33 respectively. These first and second intermediate members 32 and 33 are mounted to be freely pivotable at the ends of the bogie beam 3, as illustrated. The carrying wheels 4 and 5 are journalled at the opposite ends of the intermediate members 32 and 33. The bogie beam 3 is engaged with the intermediate member 32 and 33, at respective articulating points 34 and 35, as illustrated in FIG. 1.

Thus, there is a certain predetermined distance between the articulation points 34 and 35 (between the first and second intermediate members 32 and 33 and the bogie beam 3), and the journalling points 42 and 52 of the carrying wheels 4 and 5 (i.e., the centers of the carryings wheels 4 and 5). Therefore, the carrying wheels 4 and 5 are mounted to be freely pivotable relative to the bogie beam 3.

With the bogie construction in accordance with the present invention, the tensioning of the crawler mat 2 must be adjusted only initially upon installation of the crawler mat 2, after which the crawler mat 2 does not have to be tensioned any further. Since the carrying wheels 4 and 5 are suspended on the bogie beam 3 by way of the freely pivoting intermediate members 32 and 33 respectively, the tensioning of the crawler mat 2 is automatically adjusted in accordance with the load applied to the bogie construction.

As previously described above, the crawler mat 2 is driven by a drive roll 1, which presses the crawler mat 2 from above. The distance between the first and second carrying wheels 4 and 5 on the bogie, as well as the distance of the carrying wheels 4 and 5 from the drive roll 1, are arranged such that the crawler mat 2 is pressed between the drive roll 1 and the carrying wheels 4 and 5. By means of such a construction, the roll mat 2 is "mangled" both between the drive roll 1 and the first carrying wheel 4, and between the drive roll 1 and the second carrying wheel 5 as illustrated.

With such a construction, the drive roll 1 cannot slip on the crawler mat 2, by means of which it is now possible to considerably improve the drive.

In order to further improve the drive, the drive roll 1 is also, in a usual manner, provided with a toothing 14, which engages transverse projections 21 provided in the surface pattern 21 of the crawler mat (FIG. 1). The distance between the carrying wheels 4 and 5 may also be arranged to be greater than as described above.

In the above-described drive arrangement, the crawler mat 2 is forced to be bent, in its longitudinal direction, in two directions between the drive roll 1 and the carrying wheels 4 and 5. Such an arrangement has a considerable effect of cleaning the crawler mat 2. If, for example, clay, ice or equivalent has adhered to the crawler mat 2, then such contamination is detached from the crawler mat 2 by the effect of this two-way bending, because the crawler mat 2 is first bent in one direction, whereby the clay, ice or equivalent present on the crawler mat 2 is compressed between the surface pattern 21 on the crawler mat, and then bent in the opposite direction, whereupon these contaminations jump out of the surface pattern 21 along the crawler mat upon bending in the opposite direction.

Figure 2:
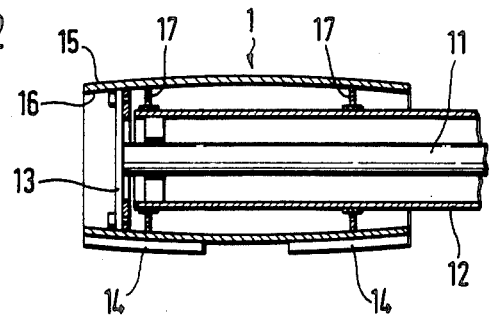
FIG. 2 is a schematic sectional view along line II—II of FIG. 1.

FIG. 2 illustrates one conceivable embodiment of a drive roll 1 in accordance with the present invention. An axle tube 12 is attached to the frame construction of the vehicle, to the bogie construction, or to an equivalent structure. The shaft 11 of the drive roll 1 is rotatably journalled inside the axle tube 12. A flange 13 is situated at the end of the shaft 11, and is attached to the drive roll 1, e.g., by screw members.

The drive roll 1 is journalled in a suitable manner, e.g., by means of a bearing 17 to the axle tube 12. As illustrated in FIG. 2, the drive roll 1 is shaped similar to a barrel. In other words, the diameter of the drive roll 1, is, in the axial direction, larger at the middle thereof than at the ends of the drive roll 1. Thus, the drive roll 1 is "cambered" in a manner similar to, for example, the belt drive in connection with a conveyor belt. As also illustrated in FIG. 2, a mantle 16 of the drive roll is curved over the axial direction.

The barrel-like shape of the drive roll considerably improves the guiding of the crawler mat 2. The drive roll 1 thereby centers the crawler mat 2 in its correct position, and prevents shifting of the crawler mat 2 off the carrying wheels 4 and 5 of the bogie. The drive roll 1 is provided with toothing 14, as stated above. The toothing 14 is attached to the mantle 16 of the drive roll 1 in a conventional manner.

As illustrated in FIGS. 1 and 2, the drive roll 1 may be coated with an elastic coating 15, which is attached to the mantle 16 of the drive roll in the direction of the circircumference between the toothings 14. The elastic coating may be formed, for example, of rubber affixed to the mantle 16 of the drive roll 1 by vulcanization. This arrangement considerably improves the cleaning of the drive roll 1, for at the contact point between the drive roll 1 and the crawler mat 2, the elastic coating 15 is compressed together. After passing this contact point, the elastic coating 15 correspondingly expands or jumps outwardly in the radial direction thereof, whereby any dirt adhering to the drive roll 1 is detached from the face of the drive roll 1.

Figure 3:
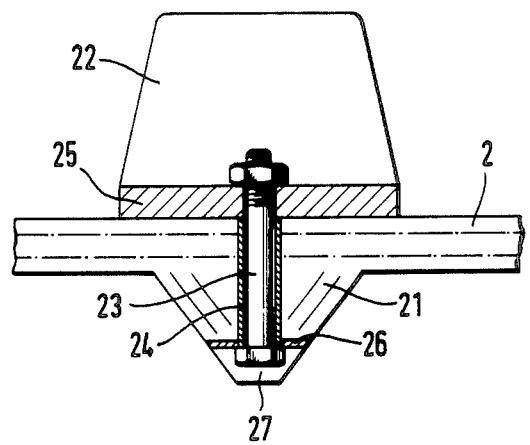
FIG. 3 is an enlarged detailed view of a crawler mat taken at circular section III in FIG. 1.
Figure 4:
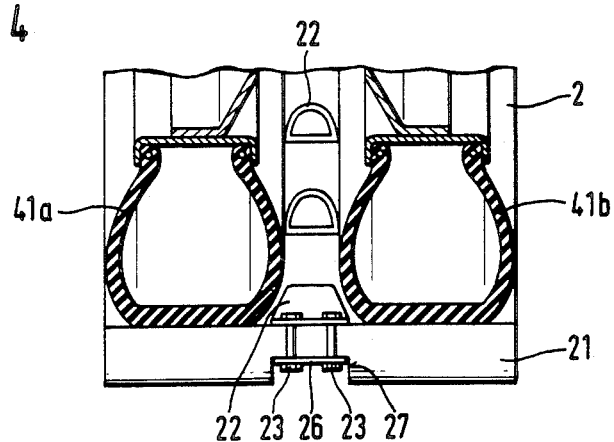
FIG. 4 is an enlarged, schematic, sectional view along line IV—IV of FIG. 1.

FIGS. 3 and 4 illustrate details of the structure of the crawler mat 2 itself. As especially seen in FIG. 4, the carrying wheels 4 and 5 of the bogie construction comprise a twin-wheel installation, about which the crawler mat 2 passes. As illustrated in FIG. 4, the carrying wheels of the bogie may be ordinary wheels provided with pneumatic tires 41A and 41B. Wheel 4 is provided with tires 41 and wheel 5 with tire 51, as illustrated in FIG. 1.

In the embodiment shown in FIGS. 3 and 4, the crawler mat 2 is provided with lateral guides 22, these lateral guides passing between the twin tires 41a and 41b when the crawler mat 2 runs over the carrying wheels 4 and 5. Additionally, the lateral guides 22 are supported against the wheels and prevent the crawler mat 2 from being shifted in the lateral direction off the carrying wheels 4 and 5. The lateral guides 22 are attached to the crawler mat 2 by means of a resilient fastening. This is important, because the principal material constituting the crawler mat 2 is itself resilient material such as rubber, plastic, or equivalent. Thus, if the lateral guides 22 were rigidly attached to the crawler mat 2, then the lateral guides 22 might be torn apart from the crawler mat 2.

In accordance with FIGS. 3 and 4, the lateral guides 22 are attached to the crawler mat 2 through screw members 23. The lateral guides 22 are attached to the crawler mat 2 through screw members 23. The lateral guides 22 are attached to the crawler mat 2 facing the transverse projections 21 in the surface pattern. In other words, as illustrated in FIG. 3, each lateral guide 22 may be connected to the crawler mat 2 on a side opposite a respective projection 21.

Holes have been formed to extend through the crawler mat 2 at the transverse projections 21. Metal sleeves 24, have been fitted, for example, into these holes. A piece of the mat has been machined off at the ridge of the projections 21, whereby recesses 27 have been formed into the projections 21 as illustrated. Washers 26 have also been fitted into these recesses 27, with the screw members 23 being inserted through the washers 26 and the sleeves 24. The respective screw members 23 extend from the inner face of the crawler mat through the flange 25 of the lateral guides 22, as best seen in FIG. 3.

The screw members 23 are tightened in position, so that the lateral guides 22, the sleeves 24, and the washers 26 each form a respective rigid unit which is resiliently affixed to the crawler mat 2. In the illustrated embodiment, which comprises a twin-wheel installation, the lateral guides 22 are fitted in the middle of the crawler mat 2 over the transverse direction thereof.

If the carrying wheels are arranged as single wheel installations, then the lateral guides must, therefore, be attached to the crawler mat 2 so that they are placed along both sides of the carrying wheels over the transverse direction. The fastening of the lateral guides 22 may also be effected so that, for example under winter conditions, the washers 26 belonging to the attaching members of the lateralguides 22 are provided with projecting anti-skidding means, for example.

The crawler mat 2 is itself constructed so that it is resilient in every direction. For example, the surface layers of the crawler mat may be made of an elastic material, while reinforcement layers within the mat may be formed to be at least partially resilient. The crawler mat 2 preferably comprises a resilient, elastic mat structure that has been reinforced by one or several reinforcement layers. The resilient material forming the crawling mat may be, for example, rubber or some rubber mixture. The reinforcement layers are, conventionally, vulcanized to the resilient material. The resilience of the crawler mat 2 may be arranged so that the reinforcement layers in the crawler mat 2 are formed of draw-threads or cords which are disposed in such a form relative to one another, that they permit resilience of the crawler mat 2.

The cords may be non-resilientin and of themselves, whereby the resilience is achieved solely by way of the particular arrangement of the cords. For example, the cords may be arranged at such an angle relative to one another, that they permit a certain extent of resilience of the crawler mat 2, when the mat 2 is subjected to strain. Longitudinal and transverse resilience of the crawler mat 2, may also be achieved so that the cords in the draw layer are arranged to be resilient in and of themselves. The resilience of the cords in the draw layers may be achieved in an entirely normal manner, e.g., by appropriate braiding of the cords.

Besides being resilient both in its longitudinal direction and in its transverse direction, the crawler mat 2 is also resilient in the direction of depth, i.e. in the direction perpendicular to the face of the crawler mat 2. Suitable resilience in the direction of depth has been favorably obtained by way of the choice of resilient material of the crawler mat 2, by the thickness of the material layer, and by corresponding factors. Thus, the structure of the crawler mat 2 is resilient in every direction.

The crawler mat 2 absorbs stones, and other rubble that enters between the crawler mat 2 and the drive roll 1, or between the crawler mat 2 and the carrying wheels 4 and 5, by means of the resilient construction thereof. Thus, the crawler mat 2 is not broken by the effect of these interferences or contaminations, with the service life of the crawler mat 2 being considerably extended over conventional constructions.

The arrangement of the bogie construction itself, also contributes to the passage of stones, etc., through the structure without damage. This has been achieved by way of the free suspension of the carrying wheels 4 and 5 upon the bogie beam 3, as described above. In other words, the bogie is resilient by the joint effect of the resilience of the crawler mat 2 itself, and of the suspension of the carrying wheels 4 and 5.

Figure 5A:
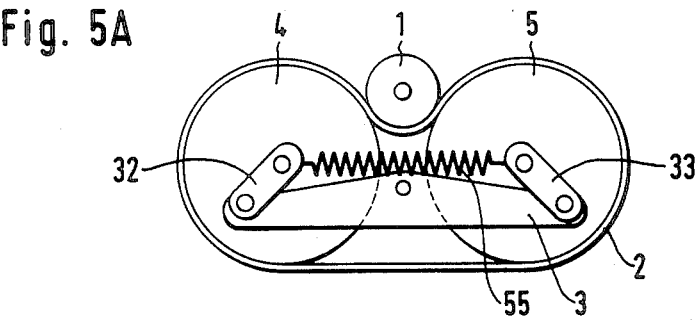
FIG. 5A to 5D are schematic, side elevational views illustrating different embodiments of a drive bogie in accordance with the present invention.

FIGS. 5A through 5D illustrate different alternative embodiments of a drive bogie in accordance with the present invention. The embodiment illustrated in FIG. 5A is equivalent to the structure illustrated in FIG. 1 in all respects, with the exception that a spring 55 is provided between the intermediate members 32 and 33, which pushes the carrying wheels 4 and 5 of the bogie further apart from one another. Thus, this spring 55 has a tensioning effect upon the crawler mat 2. Alternatively, the spring 55, may be attached to the shafts of the carrying wheels 4 and 5.

The spring 55, is however, in no way absolutely required for the operation of the present invention. In other words, as stated above, tensioning of the crawler mat 2 takes place primarily by gravity in the bogie construction in accordance with the present invention. Thus, separate tensioning members are not necessarily required. However, if desired, additional tensioning is possible for the crawler mat 2 by way of the spring 55.

Figure 5B:
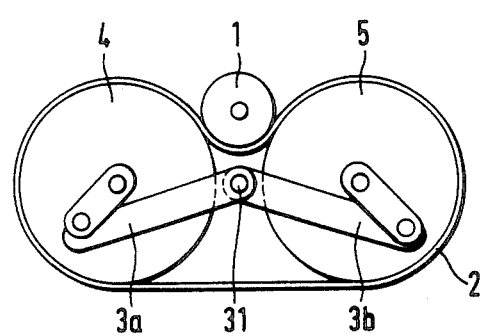

The structure of the bogie in FIG. 5B corresponds to FIG. 1, with the exception that in the structure illustrated in FIG. 5B, a divided bogie beam is used. This beam comprises a first supporting arm 3A and a second supporting arm 3B. In the embodiment of FIG. 5B, the supporting arms 3A and 3B are mounted on the pivoting center 31 of the bogie beam 3. The carrying wheels 4 and 5 are journalled upon the bogie construction more independently in the embodiment of FIG. 5B, than in the embodiment illustrated in FIG. 1.

Figure 5C:
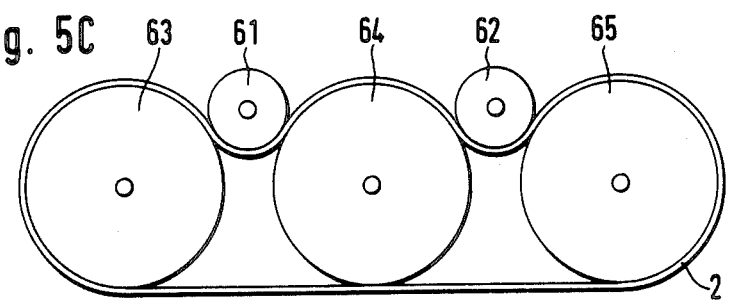
Figure 5D:
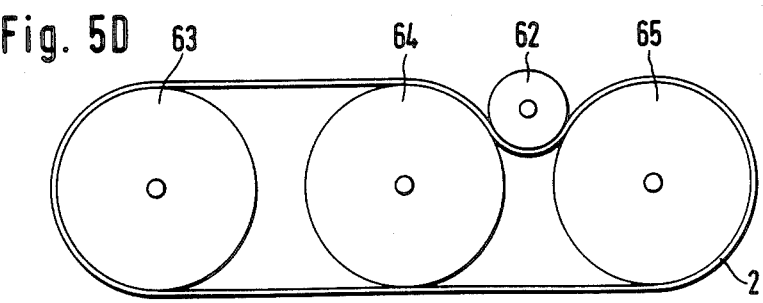

In the exemplary embodiments described above, the drive bogie has been illustrated as a construction that comprises two carrying wheels 4 and 5, arranged one after the other. The bogie construction may, however, be formed to comprise more than two carrying wheels. FIGS. 5C and 5D illustrate embodiments in which the bogie comprises three carrying wheels 63, 64 and 65, arranged one after the other. The number of carrying wheels may naturally be greater.

Thus, in FIG. 5C, a bogie structure is illustrated which comprises three carrying wheels 63, 64 and 65, arranged one after the other, between which rolls 61 and 62 are provided. These rolls 61 and 62 press the crawler mat 2 between the respective rolls 61 and 62, and the respective carrying wheels 63, 64 and 65. Both of the rolls 61 and 62 may be arranged as drive rolls, however one of the rolls 61 and 62 may also be arranged to be freely rotatable.

FIG. 5D is similar in other respects to FIG. 5C, however only one drive roll 62 is used in the bogie construction illustrated in FIG. 5D. Many other embodiments are also possible, however it is essential that the bogie in construction includes at least one drive roll, which presses the crawler mat between the drive roll and two carrying wheels.

The present invention has been described above by way of example with reference to the figures in the accompany drawings. This however, is not intended to limit the invention in any way to the illustrated examples in the figures alone. Many variations are possible within the scope of the present invention.

What is claimed is:

1. A drive bogie for a crawler vehicle, comprising:
   a bogie beam;
   at least two carrying wheels freely rotatably suspended from said bogies beam;
   an endless crawler mat passing over said wheels, said mat being constructed to be substantially resilient in every direction;
   a drive roll situated between said at least two carrying wheels to press said crawler mat from above and between said driver roll and said two carrying wheels which are situated at the sides of said drive roll;
   at least two intermediate members pivotally mounted upon said bogie beam, each wheel being suspended from a respective intermediate member,
   said bogies being resilient by the joint effect of said resilience of said crawler mat and said suspension of said carrying wheels.

2. The bogie of claim 1, additionally comprising journalling points, each wheel being journalled to a respective intermediate member at a respective journalling point, and
   articulating points, each intermediate member being freely pivotally mounted to said bogie beam at a respective articulating point, wherein said bogie beam being pivotally mounted to a frame of the vehicle, with a center of pivoting thereof located between said first and second journalling points.

3. The bogies of claim 2, wherein said pivoting center is situated substantially underneath an axis of said drive roll.

4. The bogie of claim 1, wherein
each said carrying wheel is constituted by a twin-wheel construction, and
said drive roll having diameter which varies in length over an axial direction, said diameter being larger in a mid-region of said drive roll than at ends thereof, and said drive roll comprising a mantle curving in the axial direction.

5. The bogie of claim 1, wherein said intermediate members are inclined towards one another.

6. The bogie of claim 2, wherein said bogie beam is longer than a longitudinal distance between said journalling points.

7. The bogie of claim 6, wheein said journalling points are situated above said bogie beam.

8. The bogie of claim 1, wherein said intermediate members constitute the sole means of interconnection of said wheels with said bogie beam.

9. The bogie of claim 6, wherein said intermediate members are upwardly inclined.

10. The bogie of claim 1, wherein said crawler mat comprises
at least one surface layer of elastic material, and
an inner, at least partially resilient reinforcement layer.

11. The bogie of claim 4 additionally comprising
an elastic coating being vulcanized onto said mantle of said drive roll,
whereby cleaning of said drive roll is improved.

12. The bogie of claim 1, additionally comprising tensioning means for pushing said carrying wheels further apart from one another.

13. The bogie of claim 12, wherein said tensioning means are constituted by a spring affixed to said intermediate members.

14. The bogie of claim 12 wherein said tensioning means are constituted by a spring affixed to shafts of said carrying wheels.

15. The bogie of claim 2, wherein said bogie beam is divided into two supporting arms, each supporting arm mounted upon said pivoting center of said bogie beam.

16. The bogie of claim 1, comprising
three carrying wheels arranged one after the other, with said drive roll being situated in a space between a first and second wheel of said three wheels.

17. The bogie of claim 16, additionally comprising
a second roll situated in a second space between second and third wheels of said three wheels.

18. The bogie of claim 17, wherein said second roll is also a drive roll.

19. The bogie of claim 17, wherein said second roll is freely revolving and situated to press said crawler mat between said second roll and said second and third carrying wheels.

20. A drive bogie for a crawler vehicle, comprising:
a bogie beam;
at least two carrying wheels freely rotatably suspended from said bogie beam;
an endless crawler mat passing over said wheels, said mat being constructed to be substantially resiliently in every direction;
lateral guides resiliently affixed to said crawler mat; and
a drive roll situated between said at least two carrying wheels to press said crawler mat between said driver roll and said two carrying wheels which are situated at the sides of said drive roll.

21. The bogie of claim 20, additionally comprising
transverse projections extending along a surface of said crawler mat, and
screw members for resiliently affixing said lateral guides to said crawler mat, said screw members extending through said crawler mat towards said transverse projections.

22. The bogie of claim 21, additionally comprising
a recess formed in each said tranverse projection, and
holes-extending through said crawler mat, each hole communicating with a respective recess for receiving a respective screw member.

23. The bogie of claim 21, wherein
each said carrying wheel is constituted by a twin-wheel construction comprising first and second tires respectively, said- lateral guides passing between said respective first and second tires as said crawler mat passes about said wheels.

24. The bogie of claim 21, wherein said. drive roll comprises a mantle and toothing attached to said mantle and situated to engage said transverse projections of said crawler mat.

* * * * *